United States Patent [19]

Maki et al.

[11] Patent Number: 5,777,671
[45] Date of Patent: Jul. 7, 1998

[54] SOLID STATE IMAGER HAVING HIGH FREQUENCY TRANSFER MODE

[75] Inventors: Yasuhito Maki, Kanagawa; Tetsuro Goto, Chiba; Tadao Takagi, Kanagawa; Hiroyuki Iwasaki, Tokyo, all of Japan

[73] Assignees: Sony Corporation; Nikon Corporation, both of Tokyo, Japan

[21] Appl. No.: 586,304

[22] Filed: Jan. 17, 1996

Related U.S. Application Data

[63] Continuation of Ser. No. 268,571, Jul. 6, 1994, abandoned.

[30] Foreign Application Priority Data

Jul. 8, 1993 [JP] Japan ................. 5-194315

[51] Int. Cl.$^6$ ................. H04N 3/14; H04N 5/335
[52] U.S. Cl. ................. 348/312; 348/303; 358/483
[58] Field of Search ................. 348/230, 296, 348/297, 310, 311, 314, 312, 303; 358/482, 483; H04N 3/14, 5/335

[56] References Cited

U.S. PATENT DOCUMENTS

| | | | |
|---|---|---|---|
| 3,800,169 | 3/1974 | Diaz | 307/591 |
| 4,686,571 | 8/1987 | Suzuki | 348/230 |
| 4,862,273 | 8/1989 | Ishida et al. | 348/296 |
| 4,958,183 | 9/1990 | Akada et al. | 354/412 |
| 5,057,926 | 10/1991 | Watanabe | 348/314 |
| 5,083,207 | 1/1992 | Ishida et al. | 348/314 |
| 5,097,339 | 3/1992 | Ishida et al. | 348/297 |

*Primary Examiner*—Andrew Faile
*Assistant Examiner*—Andrew B. Christensen
*Attorney, Agent, or Firm*—Hill, Steadman & Simpson

[57] ABSTRACT

A control circuit generates a control signal which is of a low level during a certain period of time after the power supply of a solid state imager has been turned on or a power save mode thereof has been canceled, and of a high level after elapse of the period of time. Based on the control signal, a timing generator generates transfer clock signals having a high frequency than when the solid state imager is in a normal transfer mode, and applies the transfer clock signals to a CCD shift register to remove or transfer excessive invalid charges at a high rate therefrom. After the power supply has been turned on or the power save mode has been canceled, therefore, the time required to bring the solid state imager into a condition capable of imaging a subject is shortened.

24 Claims, 8 Drawing Sheets

F/G. 3

SOLID STATE IMAGER HAVING HIGH FREQUENCY TRANSFER MODE

This is a continuation of application Ser. No. 08/268,571, filed Jul. 6, 1994, abandoned.

BACKGROUND OF THE INVENTION

The present invention relates to a solid state imager employing a solid state imaging component called an area sensor a linear sensor, and more particularly to a solid state imager device which employs a solid state imaging component having a normal transfer mode and a high-frequency transfer mode for transferring signal charges.

One conventional charge-coupled-device (CCD) solid state imager is illustrated in FIG. 1 of the accompanying drawings.

As shown in FIG. 1, the CCD solid state imager includes a linear sensor comprising a sensor array 71, a shift gate 72, a CCD shift register 73, and a charge detector 74. An output signal from the linear sensor is processed, e.g., sampled and held, by a signal processor 75, and outputted as an output signal Vout.

The CCD solid state imager also includes a timing generator 76 for generating, based on a master clock signal $\phi$clk and readout gate pulses $\phi$rog which are supplied from external sources through clock terminals IN1, IN2, respectively, transfer clock signals $\phi$H1, $\phi$H2 applied to the CCD shift register 73 for energizing the CCD shift register 73 in a two-phase mode, reset pulses $\phi$RS applied to reset the charge detector 74, sample-and-hold pulses $\phi$SH applied to the signal processor 75 for enabling its sample-and-hold circuit to sample and hold signal charges supplied from the charge detector 74, and a readout gate pulse $\phi$ROG applied to the shift gate 72 for reading the signal charges from the sensor array 71 into the CCD shift register 73.

Before the CCD solid state imager is switched on, the linear sensor is in thermal equilibrium. When in thermal equilibrium, the sensor array 71 and the CCD shift register 73 are full of charges. Therefore, immediately after the power supply of the CCD solid state imager is turned on, pixel signals can not be properly read from the linear sensor.

It is customary to remove excessive invalid charges from the sensor array 71 and the CCD shift register 73 immediately after the power supply of the CCD solid state imager is turned on. For completely removing excessive invalid charges from the sensor array 71 and the CCD shift register 73, it is necessary to remove them over a plurality of lines.

FIG. 2 of the accompanying drawings is a timing chart of various signals produced in the CCD solid state imager immediately after the power supply thereof is turned on. While the master clock signal $\phi$clk and the transfer clock signals $\phi$H1, $\phi$H2 are shown as being of the same frequency in FIG. 2, the frequency of the master clock signal $\phi$clk may be higher than the frequency of the transfer clock signals $\phi$H1, $\phi$H2 in some instances.

In the conventional CCD solid state imager, excessive invalid charges are removed from the sensor array 71 and the CCD shift register 73 immediately after the CCD solid state imager is switched on, using the transfer clock signals $\phi$H1, $\phi$H2 which have the same frequency as when in a normal transfer mode. Therefore, if excessive invalid charges are to be removed over 10 lines, then a processing time of about 100 msec. is required, and hence it takes time before the CCD solid state imager is brought into a condition capable of imaging a subject after its power supply is turned on.

The above problem also occurs when a power save mode for saving the electric energy consumed by the CCD solid state imager is canceled.

SUMMARY OF THE INVENTION

It is therefore an object of the present invention to provide a solid state imager which can be brought into a condition capable of imaging a subject after its power supply is turned on or a power save mode is canceled.

According to the present invention, the above object can be achieved by a solid state imager comprising: a solid state imaging section including a sensor having a plurality of pixels, the sensor comprising an at least linear array of photoelectric transducers representing the pixels, respectively, a charge transfer section for transferring signal charges read from the respective pixels of the sensor, and a charge detector for detecting signal charges transferred by the charge transfer section, converting the detected signal charges into electric signals, and outputting the electric signals; and a timing generator for generating a plurality of timing signals including a first transfer clock signal having a first frequency for energizing the charge transfer section, and a second transfer clock signal having a frequency higher than the first frequency during a predetermined period of time after the solid state imager has started to operate.

The timing generator may be disposed on the same chip as the solid state imaging section. The timing generator may change the frequencies of the transfer clock signals based on a control signal supplied from an external source through a control terminal. The solid state imager may further comprise a control circuit for generating a control signal which takes a first value during the predetermined period of time and a second value after elapse of the predetermined period of time, and supplying the control signal to the control terminal. Alternatively, the solid state imager may further comprise a time constant circuit having a time constant corresponding to the predetermined period of time and connected between a power supply and the control terminal, for applying an output signal thereof as the control signal to the control terminal.

The timing generator may generate the second transfer clock signal during the predetermined period of time after a power supply of the solid state imager has been turned on or a power save mode of the solid state imager has been canceled.

The timing generator may fix one of the timing signals to a DC level.

The sensor may comprise a linear sensor composed of a linear array of photoelectric transducers, or an area sensor composed of a two-dimensional matrix of photoelectric transducers.

According to the present invention, there is also provided a solid state imager comprising: a solid state imaging section including a sensor having a plurality of pixels, the sensor comprising an at least linear array of photoelectric transducers representing the pixels, respectively, a charge transfer section for transferring signal charges read from the respective pixels of the sensor, and a charge detector for detecting signal charges transferred by the charge transfer section, converting the detected signal charges into electric signals, and outputting the electric signals; and a timing generator for generating a plurality of timing signals including transfer clock signals for energizing the charge transfer section, at least one of the timing signals being fixed to a DC level.

The timing generator may generate a first transfer clock signal for energizing the charge transfer section at a first rate and a second transfer clock signal for energizing the charge transfer section at a second rate higher than the second rate, at least one of the timing signals being fixed to a DC level in a transfer mode governed by the second transfer clock signal.

DETAILED DESCRIPTION OF THE PREFERRED EMBODIMENTS

Figure 1:
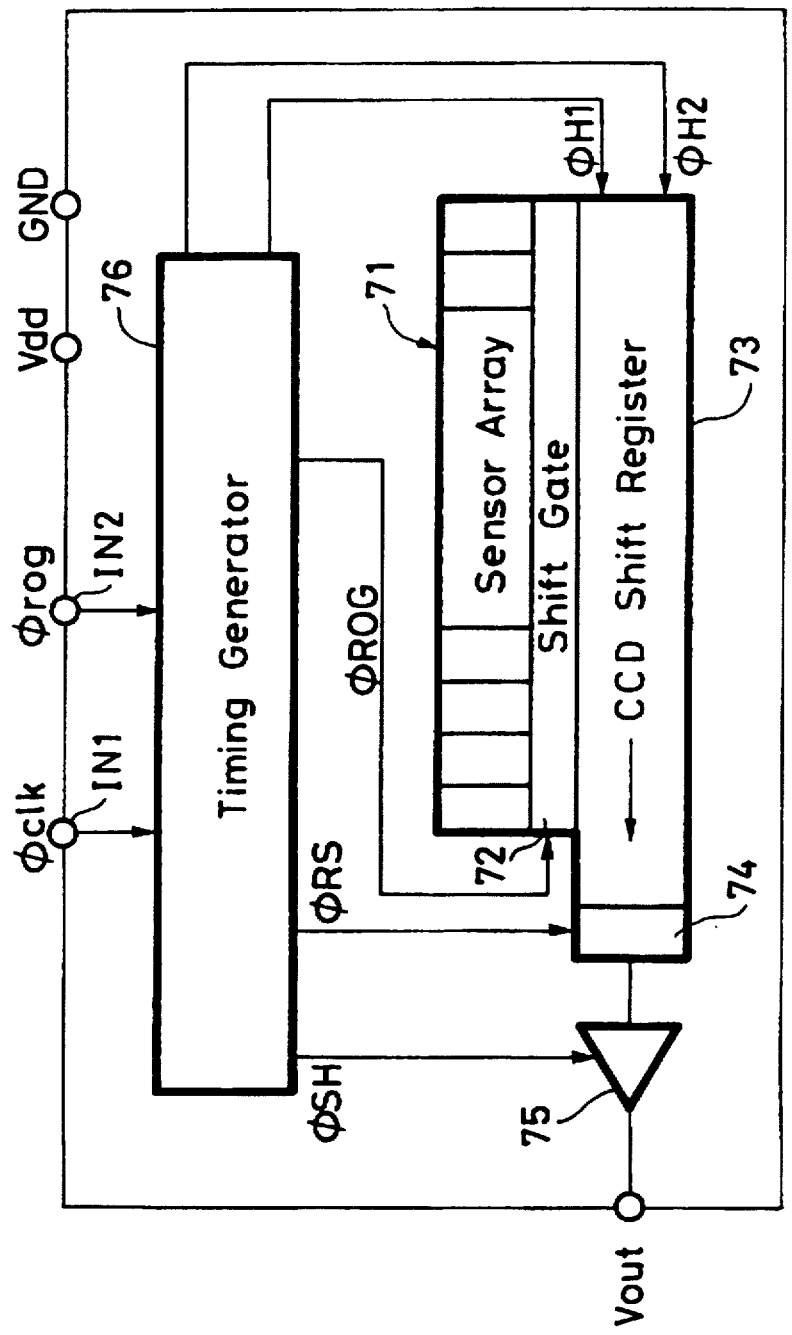
FIG. 1 is a block diagram of a conventional solid state imager.
Figure 2:
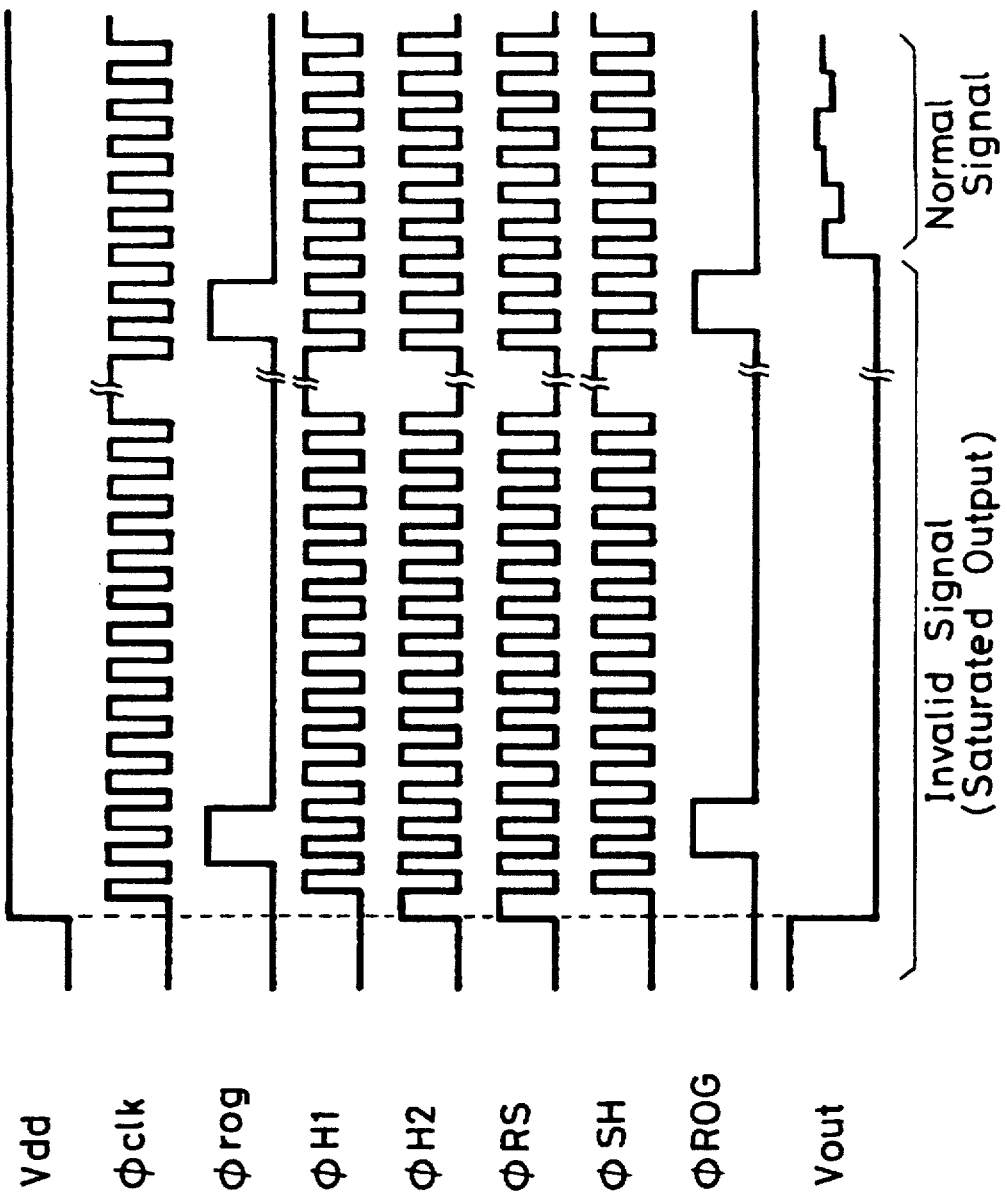
FIG. 2 is a timing chart illustrative of the manner in which the conventional solid state imager shown in FIG. 1 operates.
Figure 3:
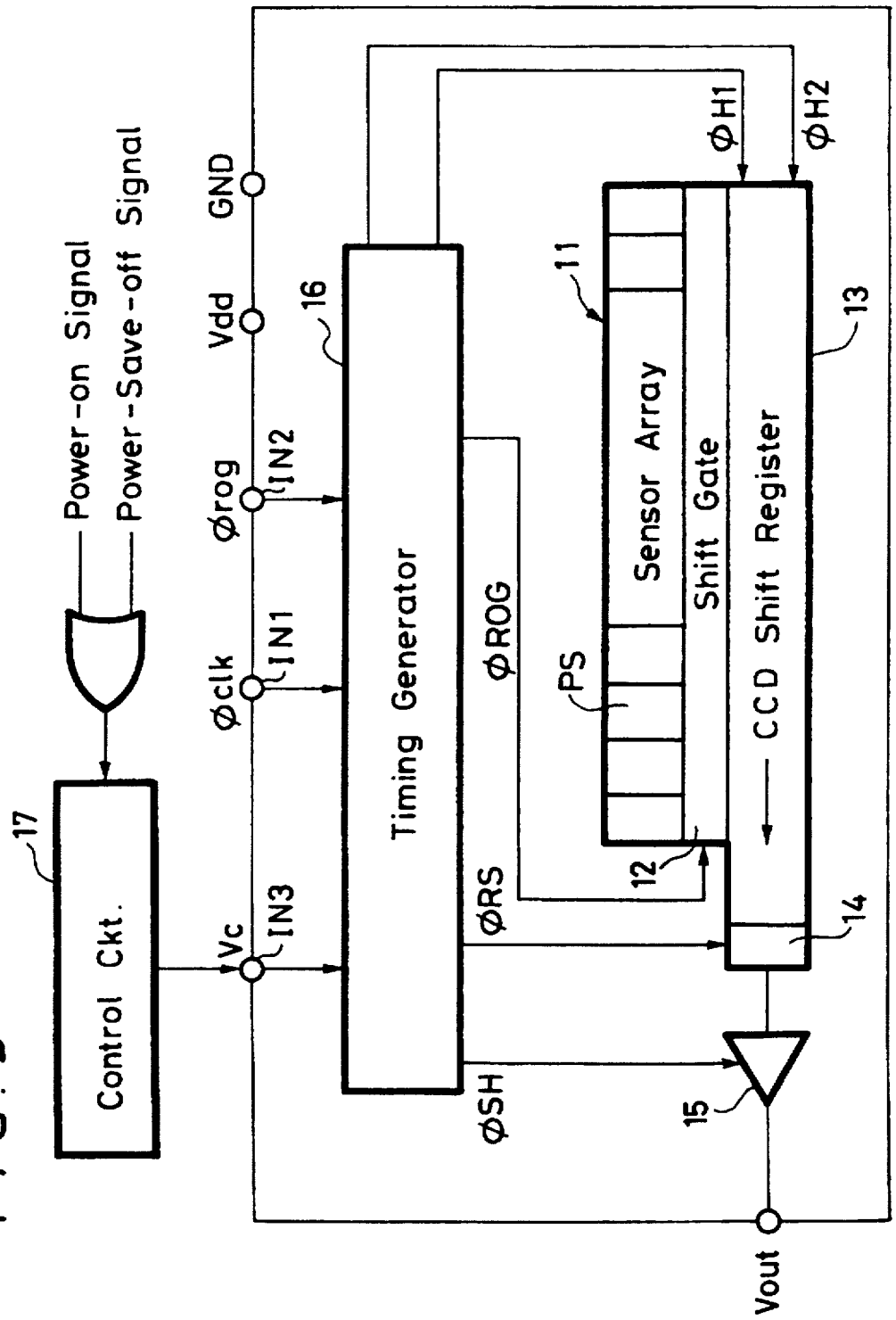
FIG. 3 is a block diagram of a solid state imager according to an embodiment of the present invention.

As shown in FIG. 3, a solid state imager device according to an embodiment of the present invention has a sensor array 11 composed of a linear array of photosensors PS, such as photodiodes, for converting incident light into signal charges which correspond to respective pixels and storing the signal charges. The signal charges, corresponding to respective pixels, stored by the sensor array 11 are read through a shift gate 12 by a charge-coupled-device (CCD) shift register (charge transfer section) 13. The signal charges thus read are successively transferred in a horizontal direction and supplied to a charge detector 14 by the CCD shift register 13.

The charge detector 14, which may be of a floating diffusion (FD) arrangement, serves to detect the signal charges transferred by the CCD shift register 13, convert the detected signal charges into signal voltages, and supply the signal voltages to a signal processor 15 connected to the charge detector 14.

Figure 4:
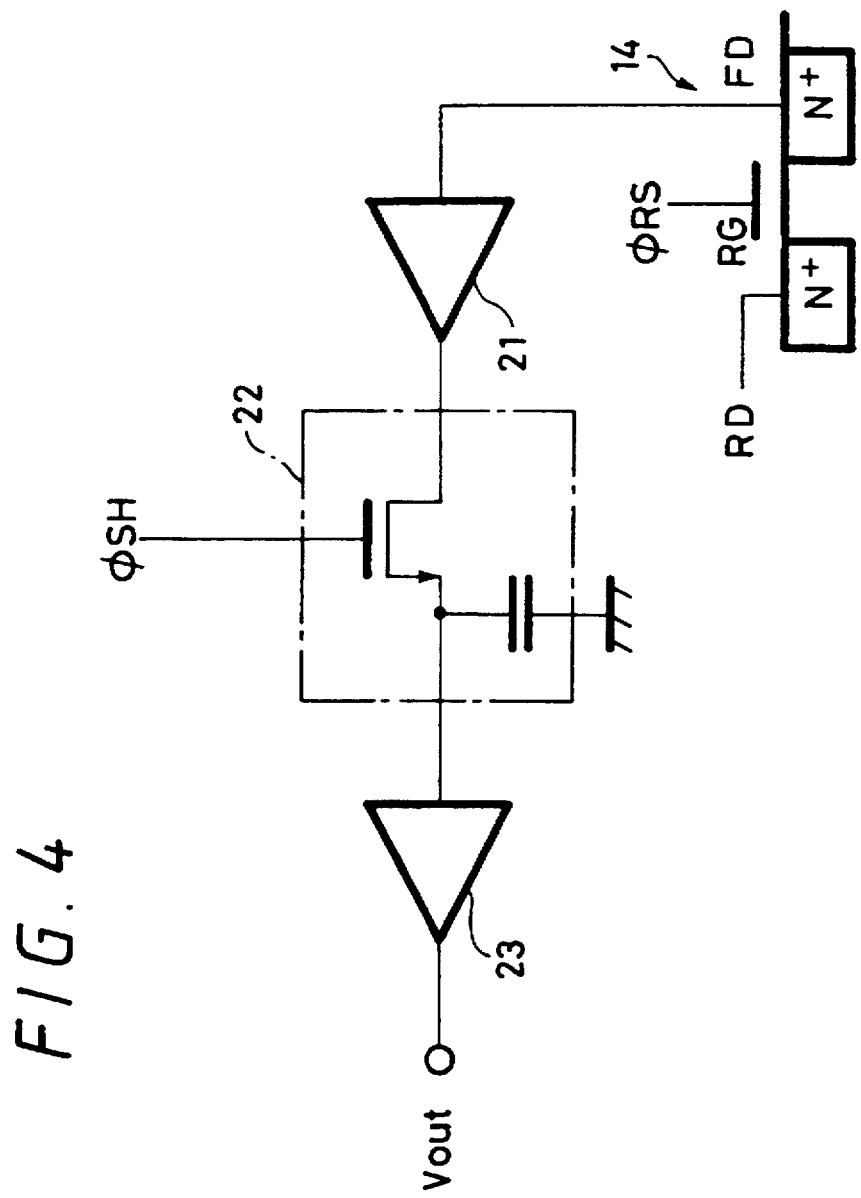
FIG. 4 is a block diagram of a signal processor in the solid state imager device shown in FIG. 3.

The signal processor 15 comprises, as shown in FIG. 4, a buffer 21 for being supplied with the signal voltages from the charge detector 14, a sample-and-hold circuit 22 for sampling and holding the signal voltages supplied from the charge detector 14 through the buffer 21, and a buffer 23 for outputting a sampled and held output signal from the sample-and-hold circuit 22 as an output signal Vout. The signal processor 15 is fabricated on the same chip as the CCD shift register 13.

The solid state imager also includes a timing generator 16 for generating various timing signals, the timing generator 16 being also fabricated on the same chip as the CCD shift register 13.

The timing generator 16 generates, based on a master clock signal φclk and readout gate pulses φrog which are supplied from external sources through respective clock terminals IN1, IN2, a readout gate pulse φROG applied to the shift gate 12 for reading the signal charges from the sensor array 11 into the CCD shift register 13, transfer clock signals φH1, φH2 applied to the CCD shift register 13 for energizing the CCD shift register 13 in a two-phase mode, reset pulses φRS applied to the charge detector 14 to reset the FD arrangement thereof, and sample-and-hold pulses φSH applied to the signal processor 15 for enabling its sample-and-hold circuit 22 to sample and hold the signal charges supplied from the charge detector 14.

The timing generator 16 is supplied with a control signal Vc from a control circuit 17 as an external circuit through a control terminal IN3.

In response to a power-on signal (which may be a power supply voltage Vdd) applied when the power supply of the solid state imager is turned on or a power-save-off signal applied when a power save mode thereof is canceled, the control circuit 17 generates the control signal Vc which is of a low level (first value) for a certain period of time after the power supply is turned on or the power save mode is canceled, and of a high level (second value) after elapse of the certain period of time.

Figure 5:
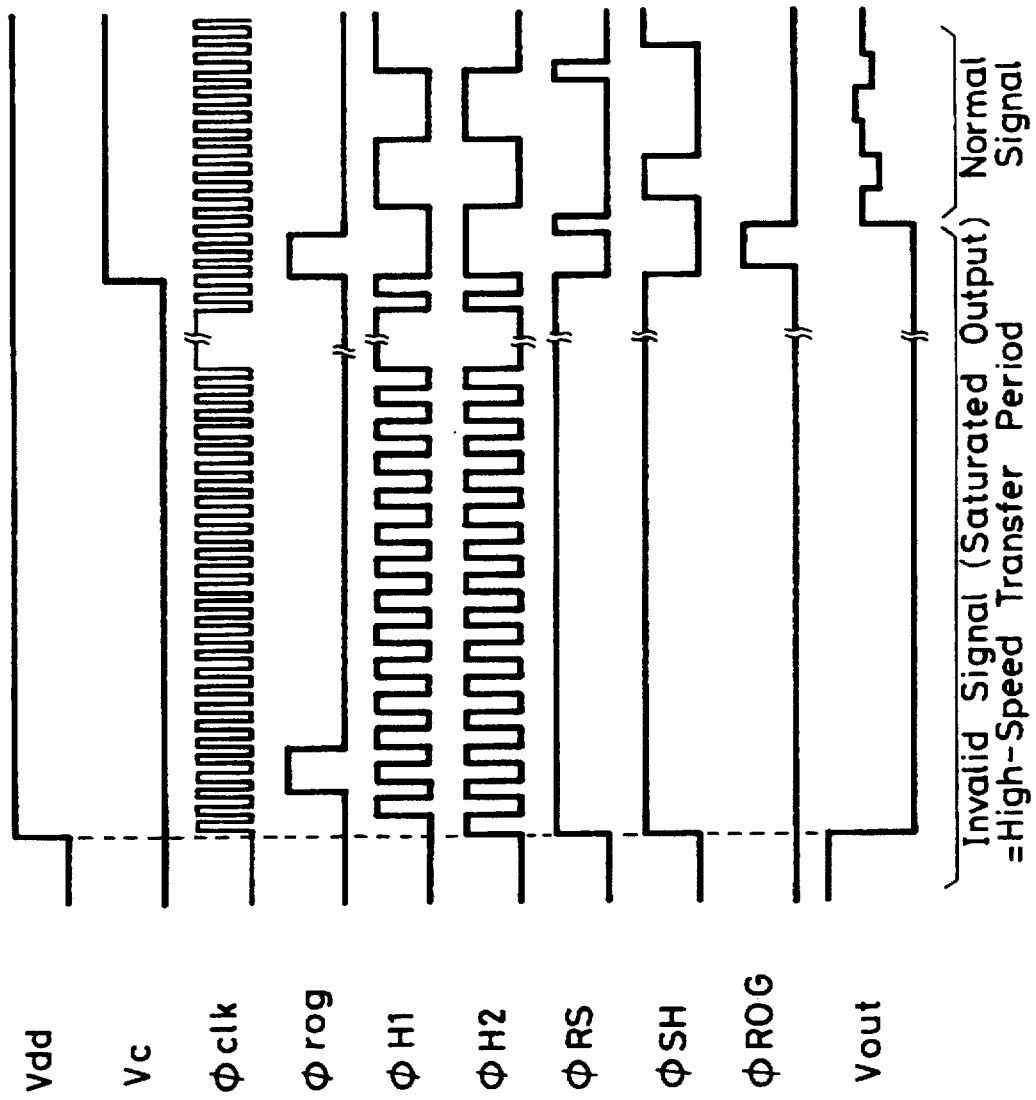
FIG. 5 is a timing chart illustrative of the manner in which the solid state imager device shown in FIG. 3 operates.

FIG. 5 is a timing chart showing the relationship between the power supply voltage Vdd, the control signal Vc, the timing signals generated by the timing generator 16, and the output signal Vout.

Figure 6:
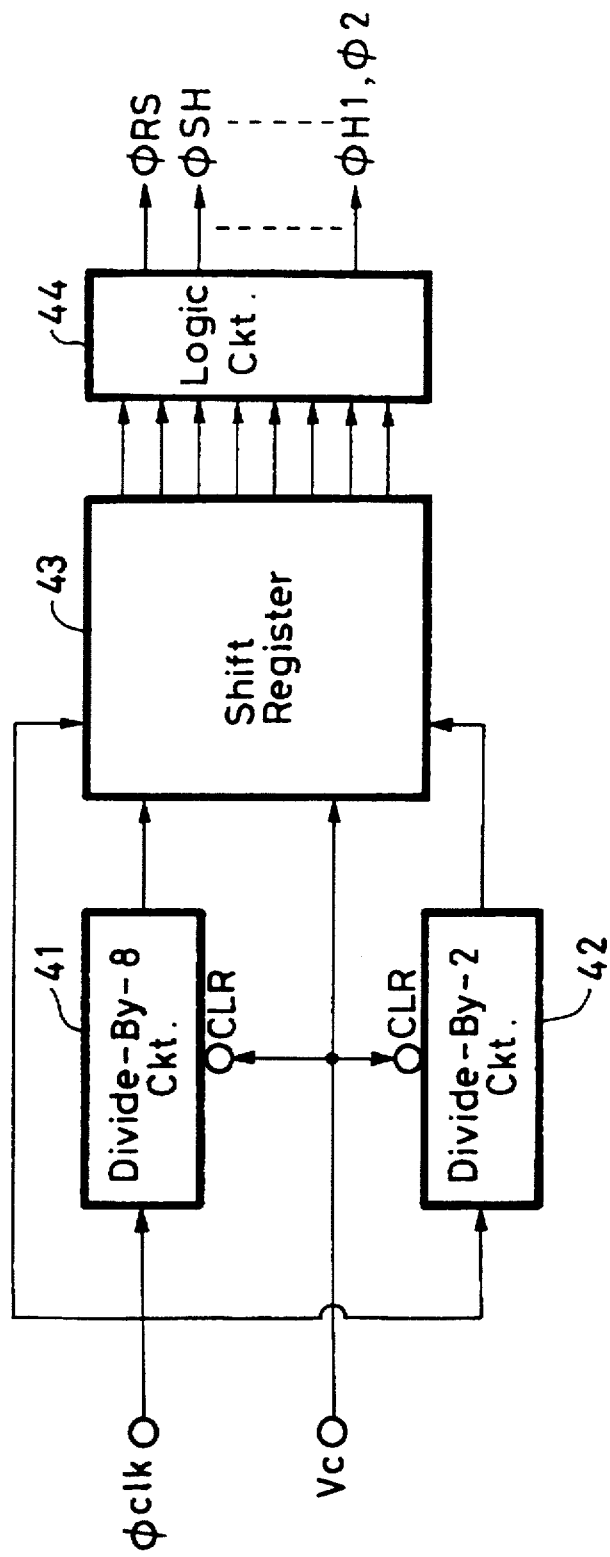
FIG. 6 is a block diagram of a timing generator in the solid state imager device shown in FIG. 3.

The timing generator 16 has a specific circuit arrangement as shown in FIG. 6. As shown in FIG. 6, the timing generator 16 has a divide-by-8 frequency divider 41 for dividing the frequency of the master clock φclk by 8, a divide-by-2 frequency divider 42 for dividing the frequency of the master clock φclk by 2, a plural-stage shift register 43 for shifting frequency-divided clock signals from the divide-by-2 and divide-by-8 frequency dividers 41, 42 in synchronism with the master clock φclk, and a logic circuit 44 for generating the various timing signals by combining logic states of an 8-bit output signal, for example, from the shift register 43.

As shown in FIG. 3, the timing generator 16 generates transfer clock signals φH1, φH2 of higher frequency during a certain period of time T after the power supply is turned on (after the positive-going edge of the power supply voltage Vdd), and transfer clock signals φH1, φH2 of lower frequency after elapse of the period of time T.

In the period of time T, the control signal Vc is of a low level, clearing the divide-by-8 frequency divider 41, and the timing generator 16 generates transfer clock signals φH1, φH2 having a frequency which is one half (½) of the frequency of the master clock φclk.

After the period of time T has elapsed, the control signal Vc is of a high level, clearing the divide-by-2 frequency divider 42, and the timing generator 16 generates transfer clock signals φH1, φH2 having a frequency which is one eighth (⅛) of the frequency of the master clock φclk. A transfer rate according to the transfer clock signals φH1, φH2 having a frequency which is ⅛ of the frequency of the master clock φclk is a normal transfer rate.

In the period of time T after the power supply is turned on, therefore, signal charges are transferred at a high rate which is four times greater than the normal transfer rate.

The period of time T is set to an interval required to completely remove excessive invalid charges from the sensor array 11 and the CCD shift register 13 when the linear sensor is in thermal equilibrium after the power supply is turned on, e.g., to an interval corresponding to about 10 lines.

Since signal charges are transferred at a high rate which is four times greater than the normal transfer rate in the period of time T after the power supply is turned on, excessive invalid charges can be removed from the sensor array 11 and the CCD shift register 13 in a short period of time. Therefore, the time required to bring the solid state imager into a condition capable of imaging a subject after its power supply is turned on is shortened.

The time required to bring the solid state imager into a condition capable of imaging a subject may also be shortened after the power save mode is canceled, i.e., the application of the master clock signal $\phi$clk which has been stopped is resumed.

In the period of time T for transferring the signal charges at a high rate, at least one of the various timing signals generated by the timing generator 16 is fixed to a DC level. For example, as shown in FIG. 5, the reset pulses $\phi$RS and the sample-and-hold pulses $\phi$SH are fixed to a high level, and the readout gate pulse +ROG is fixed to a low level.

With the timing signals other than those related to the charge transfer being fixed to the DC level, electric power consumption by circuit elements other than those circuit elements related to the charge transfer is suppressed, resulting in a lower power requirement of the solid state imager.

If the solid state imager employs a linear sensor having a shutter gate for performing an electronic shutter function, then the time required to remove excessive charges can further be shortened by fixing shutter pulses to a DC level in order to turn on the shutter gate.

Figure 7:
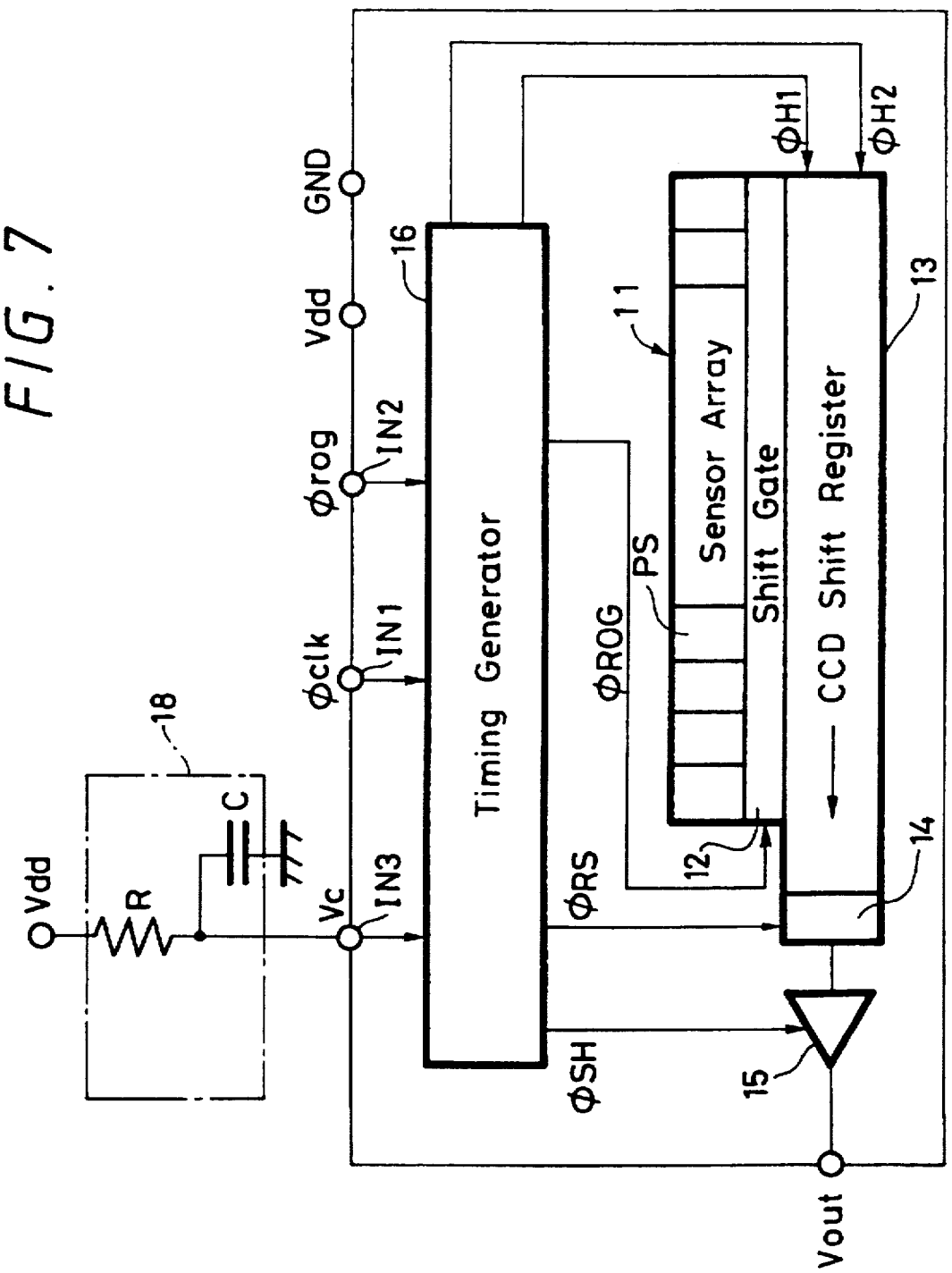
FIG. 7 is a block diagram of a solid state imager according to another embodiment of the present invention.

FIG. 7 shows a solid state imager according to another embodiment of the present invention. Those parts shown in FIG. 7 which are identical to those shown in FIG. 3 are denoted by identical reference numerals, and will not be described in detail below.

In FIG. 7, a CR time-constant circuit 18 is connected between the control terminal IN3 and the power supply Vdd. The CR time-constant circuit 18 has a time constant selected depending on the period of time T.

With the CR time-constant circuit 18 connected between the control terminal IN3 and the power supply Vdd, the potential of the control terminal IN3 rises to a high level upon elapse of the period of time T after the power supply is turned on, achieving the same condition as if the control signal Vc (see FIG. 5) were applied. Consequently, the time required to bring the solid state imager into a condition capable of imaging a subject after its power supply is turned on is shortened. The embodiment shown in FIG. 7 is of a relatively simple structure because only C, R circuit elements are connected to the control terminal IN3 and no control lines are required to be connected.

Figure 8:
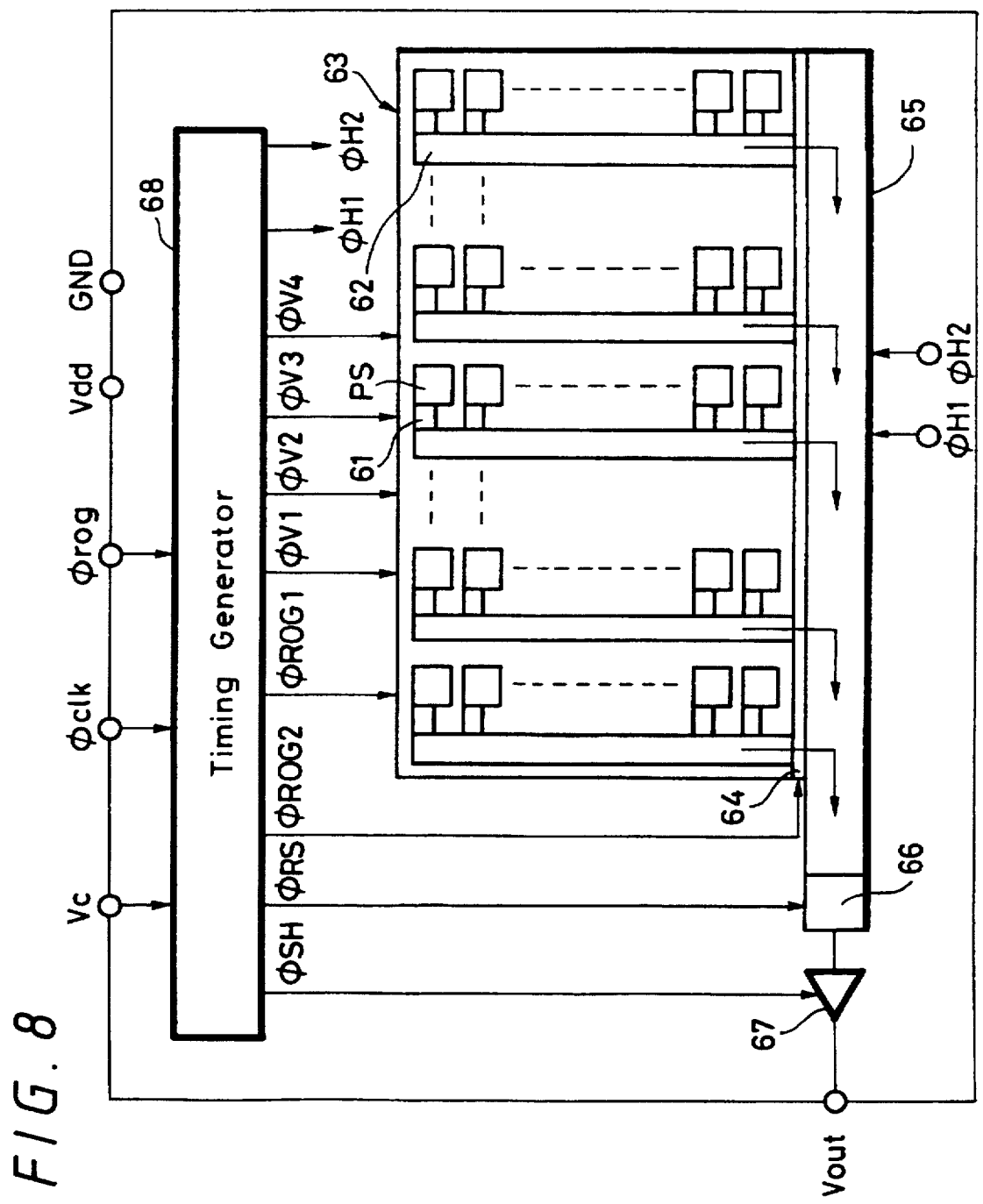
FIG. 8 is a block diagram of a solid state imager according to still another embodiment of the present invention.

The principles of the present invention are also applicable to a solid state imager device employing an area sensor as shown in FIG. 8.

In FIG. 8, the solid state imager device includes an imaging section 63 composed of a two-dimensional matrix of photosensors PS and a plurality of vertical CCD shift registers 62 associated respective with vertical arrays of photosensors PS for vertically transferring signal charges read from the photosensors PS through readout gates 61.

Signal charges read into the vertical CCD shift registers 62 are transferred, one scanning line at a time, to a horizontal shift register 65 through a shift gate 64. The signal charges corresponding to one scanning line are successively transferred in a horizontal direction and supplied to a charge detector 66 by the horizontal CCD shift register 65.

The charge detector 66, which may be of an FD arrangement, serves to detect the signal charges transferred by the horizontal CCD shift register 65, convert the detected signal charges into signal voltages, and supply the signal voltages to a signal processor 67 connected to the charge detector 66. The signal processor 67 is of the same circuit arrangement as shown in FIG. 4, and fabricated on the same chip as the CCD shift registers 62, 65.

The solid state imager device shown in FIG. 8 also includes a timing generator 68 for generating various timing signals, the timing generator 68 being also fabricated on the same chip as the CCD shift registers 62, 65.

The timing generator 68 generates, in addition to the rest pulses $\phi$RS and the sample-and-hold pulses $\phi$SH, readout gate pulses $\phi$ROG1 applied to the readout gates 61 for reading the signal charges from the photosensors PS into the vertical CCD shift registers 62, vertical transfer clock signals $\phi$V1~$\phi$V4 applied to the vertical CCD shift registers 62 for energizing the vertical CCD shift registers 62 in a four-phase mode, a readout gate pulse $\phi$ROG2 applied to the shift gate 64 for reading the signal charges from the vertical CCD shift registers 62 into the horizontal CCD shift register 65, and horizontal transfer clock signals $\phi$H1, $\phi$H2 applied to the horizontal CCD shift register 65 for energizing the horizontal CCD shift register 65 in a two-phase mode.

The horizontal CCD shift register 65, the charge detector 66, and the signal processor 67 in the solid state imager device shown in FIG. 8 operate in the same manner as the CCD shift register 13, the charge detector 14, and the signal processor 15 in the solid state imager device shown in FIGS. 3 and 4.

Therefore, the timing generator 68 generates, based on a control signal Vc supplied from the control terminal IN3, transfer clock signals $\phi$H1, $\phi$H2 having a frequency higher than in the normal transfer mode during a certain period of time after the power supply of the solid state imager is turned on, with the result that excessive invalid charges can be removed in a short period of time and hence the time required to bring the solid state imager into a condition capable of imaging a subject after its power supply is turned on can be shortened.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A solid state imager comprising:
   a solid state imaging section including:
   a sensor having a plurality of pixels, said sensor comprising an at least linear array of photoelectric transducers representing said pixels, respectively;
   a charge transfer section for transferring signal charges read from the respective pixels of said sensor;
   a charge detector for detecting signal charges transferred by said charge transfer section, converting the detected signal charges into electric signals, and outputting the electric signals;
   a signal processor for processing said electric signals output from said charge detector; and
   a timing generator for generating a plurality of timing signals for directly driving said charge transfer section, said charge detector and said signal processor respectively, said timing signals including a first transfer clock signal for driving said charge transfer section at a first rate and a second transfer clock signal for driving said charge transfer section at a second rate higher than said first rate, at least one of said timing signals other than said first and second transfer clock signals being fixed to a DC level in a transfer mode governed by said second transfer clock signal.

2. A solid state imager according to claim 1, wherein said plurality of timing signals includes reset pulses for performing resetting of said charge detector and said reset pulses are fixed to a DC level.

3. A solid state imager according to claim 1, wherein said reset pulses are fixed to a high level.

4. A solid state imager according to claim 1 further comprising:

a signal processor connected to said charge detector for processing said signal voltages;

said signal processor including a sample-and-hold circuit for sampling and holding said signal voltages.

5. A solid state imager according to claim 4, wherein said plurality of timing signals includes sample-and-hold pulses for performing sampling and holding of said charge signals and said sample-and-hold pulses are fixed to a DC level.

6. A solid state imager according to claim 4, wherein said sample-and-hold pulses are fixed to a high level.

7. A solid state imager according to claim 1 further comprising:

a shift gate connected between said sensor and said charge transfer section.

8. A solid state imager according to claim 7, wherein said plurality of timing signals includes a read out gate pulse for reading said signal charges from said sensor into said charge transfer section and said read out gate pulse is fixed to a DC level.

9. A solid state imager according to claim 8, wherein said read out gate pulse is fixed to a low level.

10. A solid state imager, comprising:

a sensor having a plurality of pixels, said sensor comprising an at least linear array of photoelectric transducers representing said pixels, respectively;

a charge transfer section for transferring signal charges read from the respective pixels of said sensor;

a charge detector for detecting signal charges transferred by said charge transfer section, converting the detected signal charges into electric signals, and outputting the electric signals;

a timing generator for generating a plurality of timing signals including a first transfer clock signal for driving said charge transfer section at a first rate, a second transfer clock signal for driving said charge transfer section at a second rate higher than said first rate, and reset pulses for performing a reset operation of said charge detector, said reset pulses being fixed to a DC level in a transfer mode governed by said second transfer clock signal.

11. A solid state imager according to claim 10, wherein said reset pulses are fixed to a high level.

12. A solid state imager according to claims 10 further comprising:

a signal processor connected to said charge detector, for processing said electric signals;

said signal processor including a sample-and-hold circuit for sampling and holding said electric signals.

13. A solid state imager according to claim 12, wherein said plurality of timing signals includes sample-and-hold pulses for performing sampling and holding of said electric signals and said sample-and-hold pulses are fixed to a DC level in said transfer mode governed by said second transfer clock signal.

14. A solid state imager according to claim 13, wherein said sample-and-hold pulses are fixed to a high level.

15. A solid state imager according to claim 10 further comprising:

a shift gate connected between said sensor and said charge transfer section.

16. A solid state imager according to claim 15, wherein said plurality of timing signals includes a read out gate pulse for reading said signal charges from said sensor into said charge transfer section and said read out gate pulse is fixed to a DC level in said transfer mode governed by said second transfer clock signal.

17. A solid state imager according to claim 16, wherein said read out gate pulse is fixed to a low level.

18. A solid state imager comprising:

a sensor having a plurality of pixels, said sensor comprising an at least linear array of photoelectric transducers representing said pixels, respectively;

a charge transfer section for transferring signal charges read from the respective pixels of said sensor;

a charge detector for detecting signal charges transferred by said charge transfer section, converting the detected signal charges into electric signals, and outputting the electric signals;

a signal processor connected to said charge detector for processing said electric signals, said signal processor including a sample-and-hold circuit for sampling and holding said electric signals;

a timing generator for generating a plurality of timing signals including a first transfer clock signal for driving said charge transfer section at a first rate, a second transfer clock signal for driving said charge transfer section at a second rate higher than said first rate, and sample-and-hold pulses for performing sampling and holding of said electric signals, and said sample-and-hold pulses are fixed to a DC level in said transfer mode governed by said second transfer clock signal.

19. A solid state imager according to claim 18, wherein said sample-and-hold pulses are fixed to a high level.

20. A solid state imager according to claim 18, wherein said plurality of timing signals includes reset pulses for performing resetting of said charge detector and said reset pulses are fixed to a DC level in said transfer mode governed by said second transfer clock signal.

21. A solid state imager according to claim 20, wherein said reset pulses are fixed to a high level.

22. A solid state imager according to claim 18 further comprising:

a shift gate connected between said sensor and said charge transfer section.

23. A solid state imager according to claim 22, wherein said plurality of timing signals includes a read out gate pulse for reading said signal charges from said sensor into said charge transfer section and said read out gate pulse is fixed to a DC level in said transfer mode governed by said second transfer clock signal.

24. A solid state imager according to claim 23, wherein aid read out gate pulse is fixed to a low level.

* * * * *